(12) United States Patent
Cheng

(10) Patent No.: US 8,740,527 B2
(45) Date of Patent: Jun. 3, 2014

(54) SELF-DRILLING WALL ANCHOR DEVICE

(76) Inventor: Ming-Chia Cheng, Kaohsiung (TW)

( * ) Notice: Subject to any disclaimer, the term of this patent is extended or adjusted under 35 U.S.C. 154(b) by 127 days.

(21) Appl. No.: 13/547,285

(22) Filed: Jul. 12, 2012

(65) Prior Publication Data

US 2014/0017026 A1    Jan. 16, 2014

(51) Int. Cl.
  *F16B 13/06*    (2006.01)
  *F16B 13/00*    (2006.01)

(52) U.S. Cl.
  CPC ............. *F16B 13/003* (2013.01); *F16B 13/061* (2013.01)
  USPC .............................................. 411/55; 411/29

(58) Field of Classification Search
  USPC ...................... 411/29, 34, 55, 80.1, 80.2, 411
  See application file for complete search history.

(56) References Cited

U.S. PATENT DOCUMENTS

| | | | | |
|---|---|---|---|---|
| 2,871,749 A | * | 2/1959 | Kalb ............................ | 411/80.1 |
| 3,316,796 A | * | 5/1967 | Young ............................ | 411/29 |
| 3,888,156 A | * | 6/1975 | Fima ............................... | 411/38 |
| 7,713,010 B2 | * | 5/2010 | Cheng ............................ | 411/29 |
| 7,938,606 B2 | * | 5/2011 | Zimmerer ....................... | 411/55 |
| 2006/0067803 A1 | * | 3/2006 | Hsu .................................. | 411/29 |
| 2008/0008554 A1 | * | 1/2008 | Lu .................................... | 411/29 |

* cited by examiner

*Primary Examiner* — Flemming Saether
(74) *Attorney, Agent, or Firm* — Rosenberg, Klein & Lee

(57) ABSTRACT

A self-drilling wall anchor device comprises a threaded member having a first threaded section and a second threaded section that provide different diameters, and an outer sleeve having a through hole that provides connective first area, second area, and third area. A second area diameter of the second area is larger than a first diameter of the first threaded section but smaller than a second diameter of the second threaded section. A third area diameter of the third area is larger than the second area diameter of the second area. When the first threaded section and the second threaded section cooperate with the outer sleeve for drilling, the second threaded section blocks the second area and the third area. Arms of the outer sleeve warp and curl out of a gypsum object, not into the gypsum object. The present invention reaches a favorable gripping effect and a preferable anti-retracting performance.

2 Claims, 6 Drawing Sheets

SELF-DRILLING WALL ANCHOR DEVICE

BACKGROUND OF THE INVENTION

1. Field of the Invention

The present invention relates to a fastener design, particularly to a self-drilling wall anchor device.

2. Description of the Related Art

Referring to FIGS. 1 and 2, a conventional self-drilling wall anchor comprises a threaded member 11, an outer sleeve 12 penetrated by the threaded member 11, and a drill element 13 connected to the threaded member 11. Wherein, the threaded member 11 is made of metal and has a shank 111, a head 112 disposed at one end of the shank 111, an engaging part 113 disposed at the other end of the shank 111, and a threaded section 114 spirally disposed on the shank 111. Herein, the threaded section 114 has a first diameter a1 larger than a second diameter a2 of the engaging part 113.

The outer sleeve 12 is made of plastic and allows the threaded member 11 to penetrate. The outer sleeve 12 has a body 121, a through hole 122 defined in the body 121, a threaded portion 123 disposed on the body 121, and arms 124 disposed on the body 121, opposite to the threaded portion 123. Wherein, the body 121 has a first end 1211 and a second end 1212 defined thereon, the first end 1211 and the second end 1212 are communicated with the through hole 122, the threaded portion 123 is disposed near the second end 1212, and a peripheral flange 1231 whose outer diameter is larger than a main diameter of the body 121 is protruded on the second end 1212. A plurality of slots 1241 are defined on the arms 124. Moreover, the through hole 122 has a first area 1221 adjacent to the first end 1211, and a second area 1222 connected to the first area 1221 and adjacent to the second end 1212. The second area 1222 has a second area diameter b2 that is larger than a first area diameter b1 of the first area 1221. Whereby, when the threaded member 11 enters the through hole 122, the first area 1221 accommodates the engaging part 113, and the second area 1222 accommodates the threaded section 114. Additionally, the second area diameter b2 is larger than the first diameter a1, and the first diameter a1 is larger than the first area diameter b1.

The drill element 13 is made of metal. The drill element 13 has a drilling member 131 and a bore 132 disposed opposite to the drilling member 131 for fixing the engaging part 113. When the threaded member 11 enters the through hole 122 of the outer sleeve 12, the threaded section 114 is accommodated in the first area 1221, and the engaging part 113 protrudes out of the first end 1211 for being fixed to the drill element 13. Thereby, the assemblage of the self-drilling wall anchor device 1 is complete.

Referring to FIGS. 2 and 3, in using, the drill element 13 is set against a gypsum object 2. Thereafter, the threaded member 11 brings the outer sleeve 12 into the gypsum object 2 by screwing. At the time the peripheral flange 1231 touches the gypsum object 2, the threaded member 11 keeps screwing and rotating, so that the arms 134 start deforming and twisting. When the arms 124 achieve their extreme deformation and twisting, the threaded member 11 stops rotating since the screwing thereof is complete, and the threaded member 11 is firmly fixed.

In practice, the second area diameter b2 of the outer sleeve 12 is larger than the first diameter a1 of the threaded section 114. Thus, an interstice is incurred between the threaded section 114 and the second area 1222. While the threaded member 11 keeps screwing and the arms 124 continue deforming and twisting, the threaded section 114 can not block the second area 1222 thoroughly, so the deformed and twisted arms 124 easily get into the interstice between the threaded section 114 and the second area 1222 and even break a part of the gypsum object 2. Subsequently, the fixed self-drilling wall anchor device 1 can only grip the rest of the gypsum object 2 that is not broken. Moreover, the twisted and deformed arms 124 are simply propped by the peripheral flange 1231. Therefore, the self-drilling wall anchor device 1 can not provide a satisfactory gripping effect since it might easily retract.

SUMMARY OF THE INVENTION

It is therefore the purpose of this invention to provide a self-drilling wall anchor device that does not over-twist or break a gypsum object while a fastening effect and an anti-pulling effect are enhanced.

The self-drilling wall anchor device in accordance with the present invention comprises:

a threaded member having a shank, a head disposed at one end of the shank, an engaging part disposed at the other end of the shank, and a first threaded section as well as a second threaded section spirally disposed on the shank, between the head and the engaging part; wherein, a first diameter of the first threaded section is different from a second diameter of the second threaded section;

an outer sleeve made of a plastic material and allowing the threaded member to penetrate; the outer sleeve having a body, a through hole defined in the body, a threaded portion disposed on the body, and arms disposed on the body, opposite to the threaded portion; wherein, the body has a first end and a second end defined thereon, the first end and the second end are communicated with the through hole in which a first area is formed adjacent to the first end, a second area with a second area diameter is connected to the first area, and a third area with a third area diameter is connected to the second area and disposed near the second end; the first area diameter, the second area diameter and the third area diameter being different from each other; the second area diameter being further larger than the first diameter of the first threaded section but smaller than the second diameter of the second threaded section, and the third area diameter being larger than the second diameter of the second threaded section; the threaded portion being disposed near the second end, a peripheral flange being formed between the threaded portion and the second end, the peripheral flange has an outer diameter larger than a main diameter of the body, and a plurality of slots are defined on the arms; and a drill element having a drilling member and a bore disposed opposite to the drilling member for fixing the engaging part.

Preferably, the first diameter of the first threaded section is smaller than the second diameter of the second threaded section, and the first diameter of the first threaded section is larger than a third diameter of the engaging part; the third area diameter of the third area is larger than the second area diameter of the second area, and the second area diameter is larger than the first area diameter.

Accordingly, the cooperation of the threaded member and the outer sleeve allows the second threaded section to block the second area and the third area. Thereby, the outer sleeve is able to enter the gypsum object via the threaded member. Thereafter, at the time the peripheral flange touches gypsum object, the arms of the outer sleeve start deforming and twisting. Preferably, the deformed and twisted arms stay out of the gypsum object, not get into the gypsum object. Therefore, the self-drilling wall anchor device provides a favorable gripping effect and an anti-retracting performance.

DETAILED DESCRIPTION OF THE PREFERRED EMBODIMENTS

Figure 1:
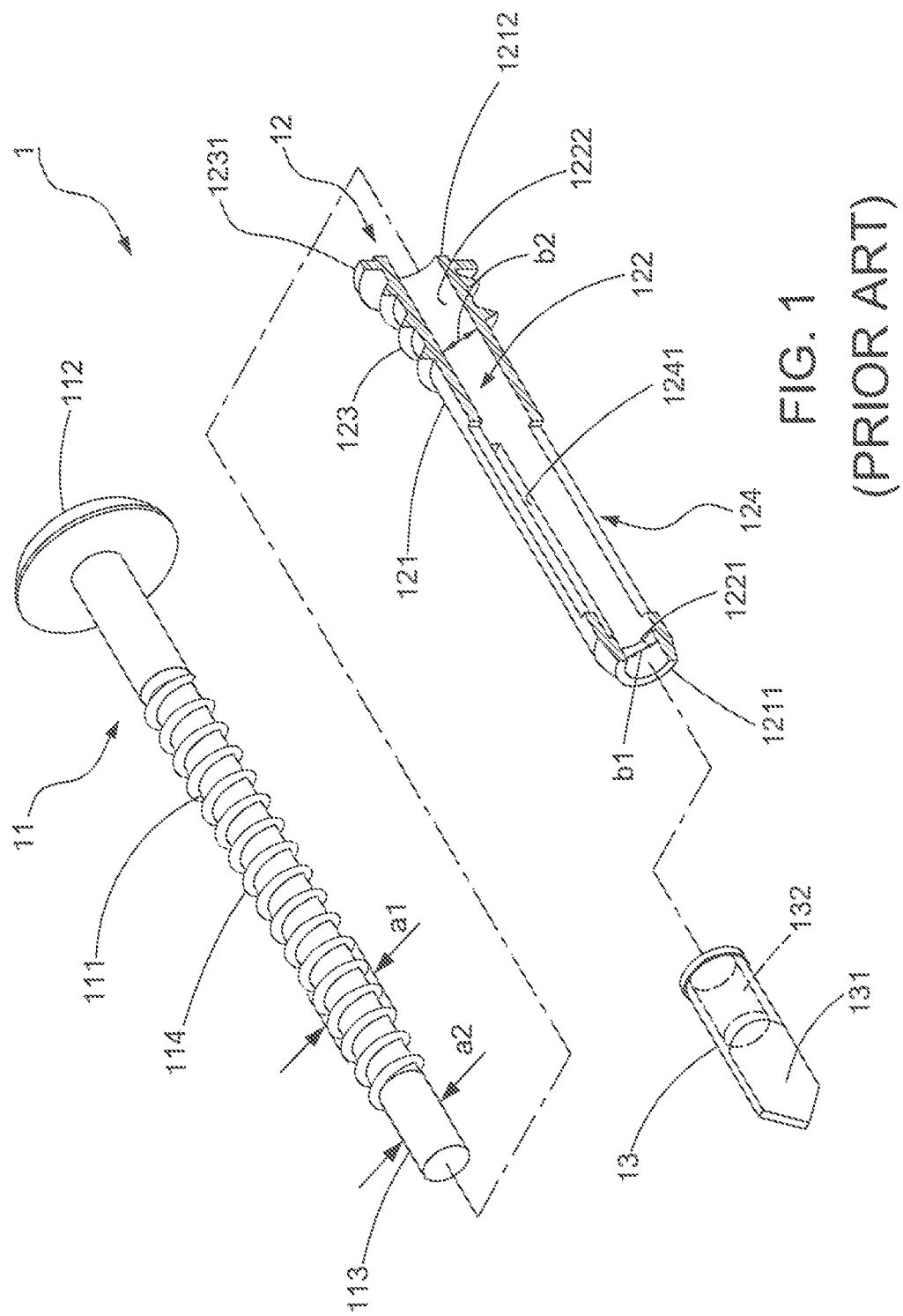
FIG. 1 is a schematic view showing a conventional self-drilling wall anchor device.
Figure 2:
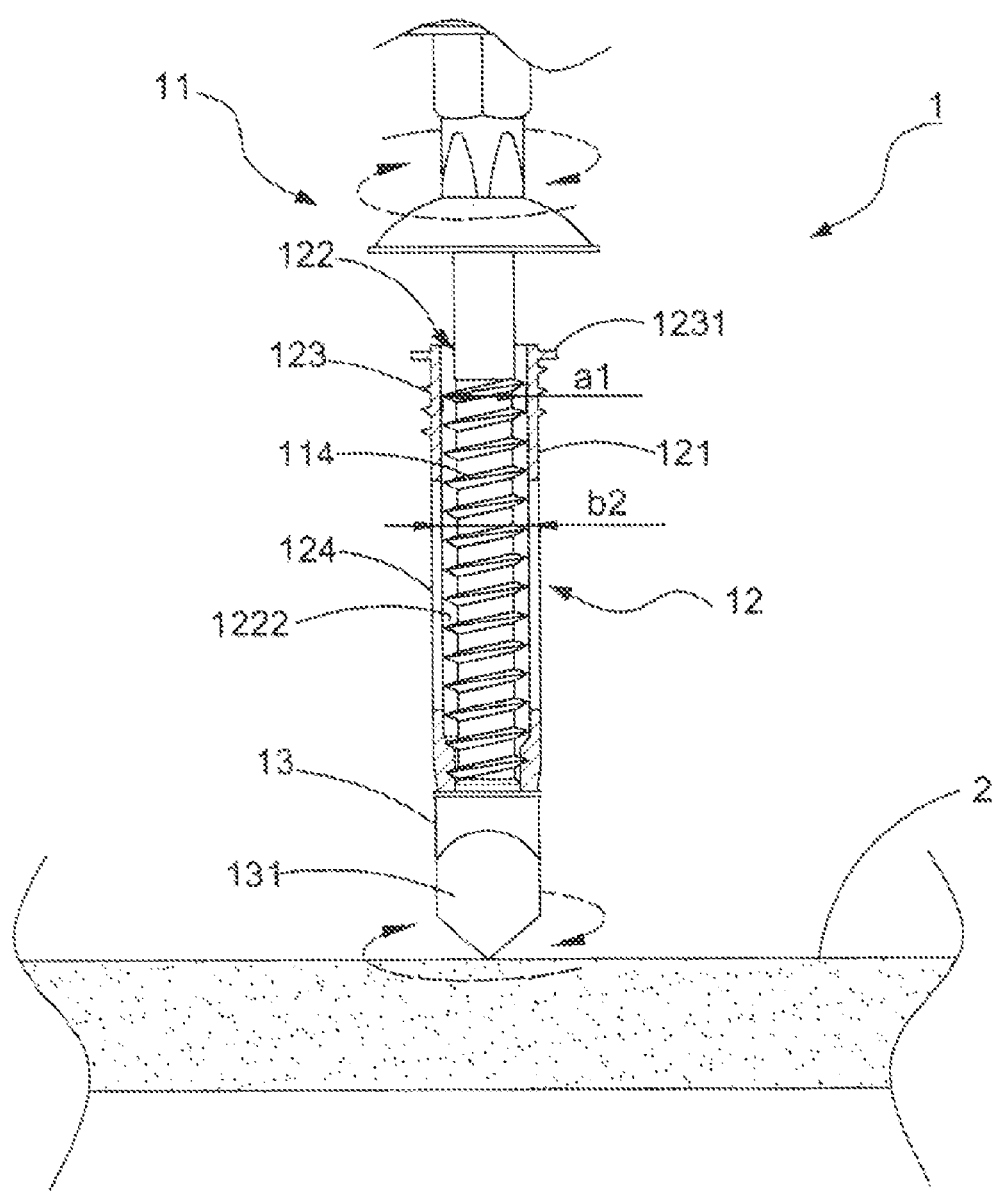
FIGS. 2 to 3 are schematic views showing the conventional self-drilling wall anchor device in using.
Figure 3:
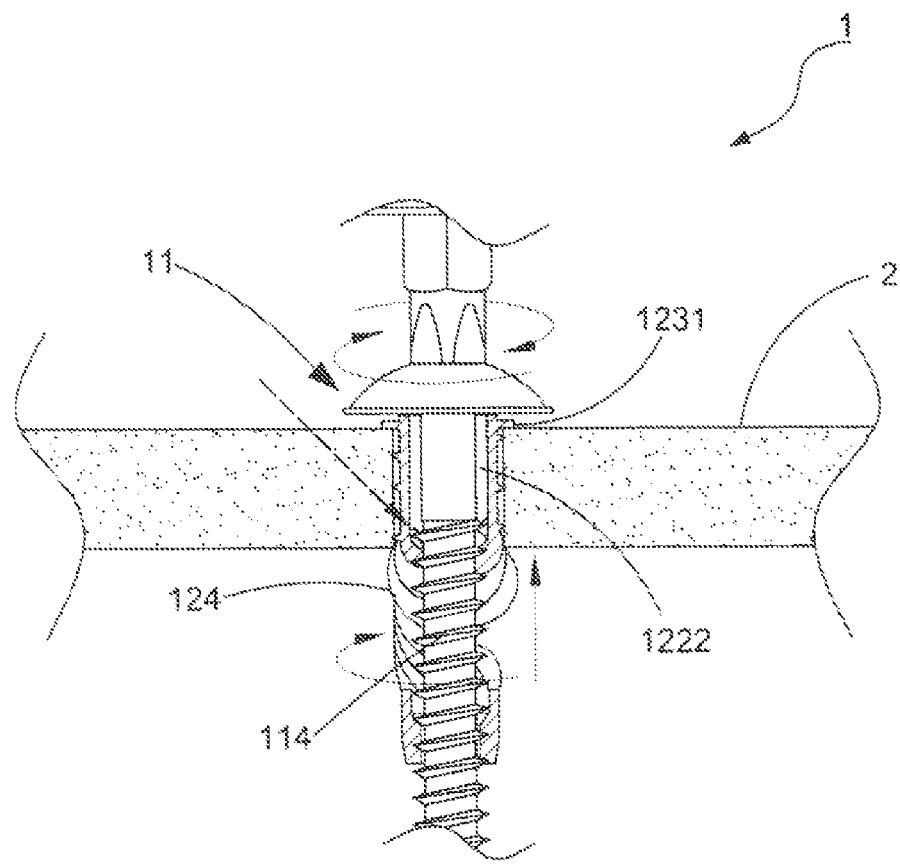

Wherever possible, the same reference numbers are used in the drawings and the description to refer to the same or like parts.

Figure 4:
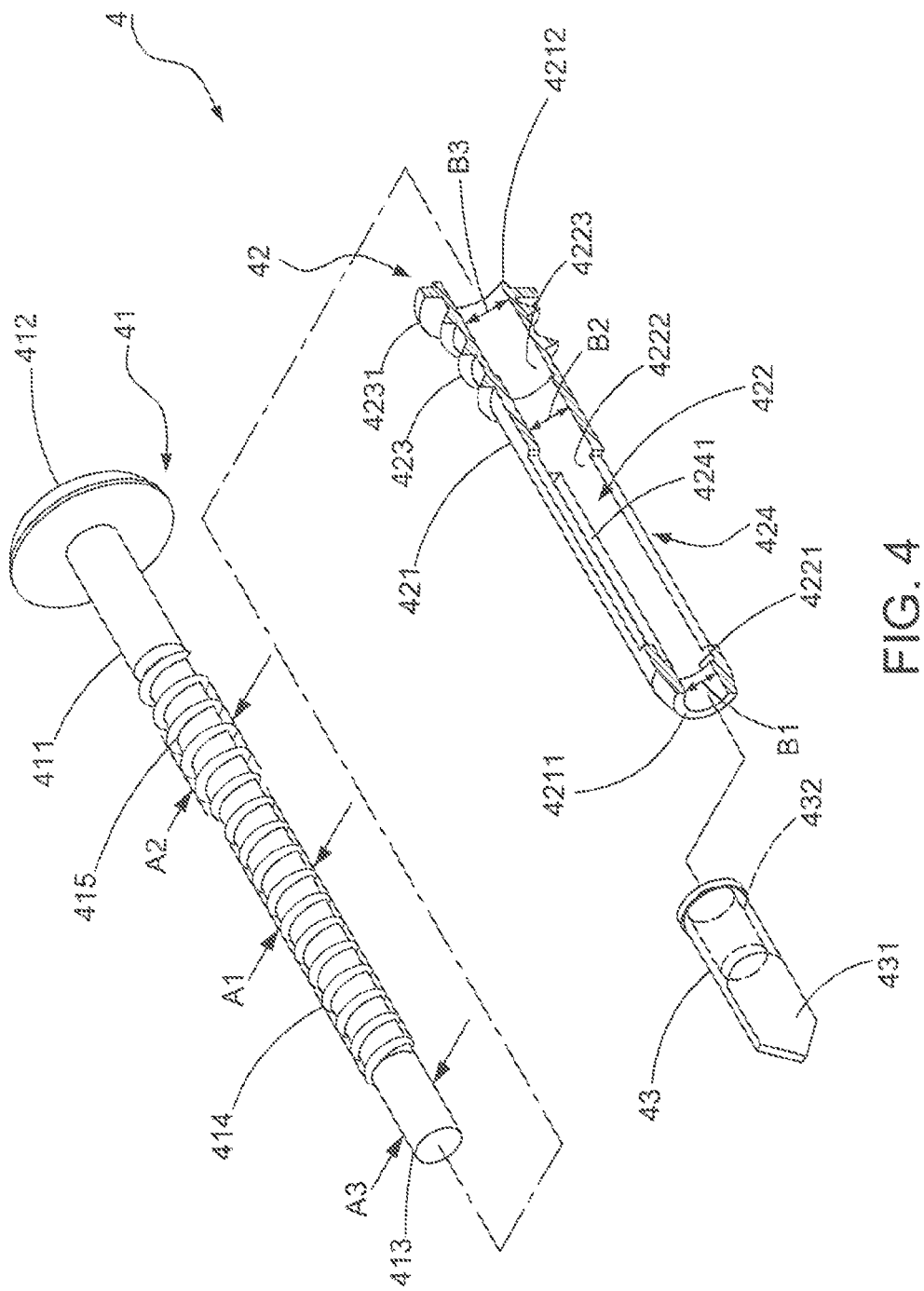
FIG. 4 is an exploded view showing a first preferred embodiment of the present invention.
Figure 5:
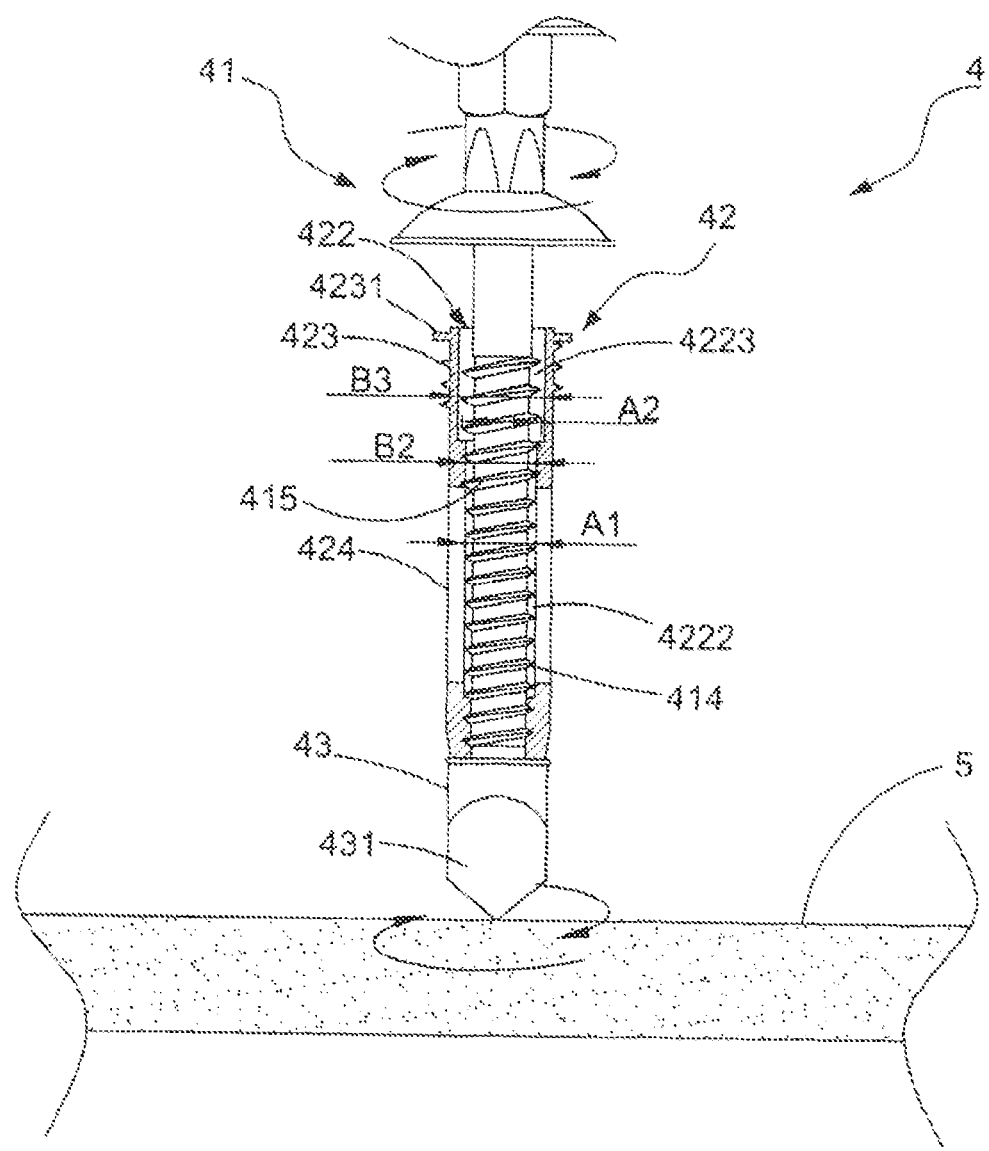
FIGS. 5 and 6 are schematic views showing the first preferred embodiment of the present invention in using.

Referring to FIGS. 4 and 5, a first preferred embodiment of the present invention is shown. A self-drilling wall anchor device 4 comprises a threaded member 41, an outer sleeve 42 for the threaded member 41 to penetrate, and a drill element 43 connected to the threaded member 41. The threaded member 41 is made of metal and has a shank 411, a head 412 disposed at one end of the shank 411, an engaging part 413 disposed at the other end of the shank 411, and a first threaded section 414 as well as a second threaded section 415 spirally disposed on the shank 411, between the head 412 and the engaging part 413. Wherein, the first threaded section 414 and the second threaded section 415 have different diameters. In this embodiment, a first diameter A1 of the first threaded section 414 is smaller than a second diameter A2 of the second threaded section 415, and the first diameter A1 of the first threaded section 414 is larger than a third diameter A3 of the engaging part 413.

Continuingly, the outer sleeve 42 for the threaded member 41 to penetrate is made of plastic and has a body 421, a through hole 422 defined in the body 421, a threaded portion 423 disposed on the body 421, and arms 424 disposed on the body 421, opposite to the threaded portion 423. Wherein, the body 421 has a first end 4211 and a second end 4212 defined thereon, the first end 4211 and the second end 4212 are communicated with the through hole 422 in which a first area 4221 is formed adjacent to the first end 4211, a second area 4222 is connected to the first area 4221, and a third area 4223 is connected to the second area 4222 and disposed near the second end 4212. Wherein, the first area 4221, the second area 4222, and the third area 4223 have different diameters. In this embodiment, a third area diameter B3 of the third area 4223 is larger than a second area diameter B2 of the second area 4222, and the second area diameter B2 is larger than a first area diameter B1 of the first area 4221. Accordingly, when the threaded member 41 enters the through hole 422, the first area 4221 accommodates the engaging part 413, and the second area 4222 accommodates the first threaded section 414. The second area diameter B2 is further larger than the first diameter A1 of the first threaded section 414 but smaller than the second diameter A2 of the second threaded section 415, and the third area diameter B3 is larger than the second diameter A2 of the second threaded section 415. The threaded portion 423 is disposed near the second end 4212, and a peripheral flange 4231 is formed between the threaded portion 423 and the second end 4212. The peripheral flange 4231 has an outer diameter larger than a main diameter of the body 421, and a plurality of slots 4241 are defined on the arms 424.

Further, the drill element 43 is made of metal and has a drilling member 431 and a bore 432 disposed opposite to the drilling member 431 for fixing the engaging part 413. Wherein, the threaded member 41 and the outer sleeve 42 are assembled.

Figure 6:
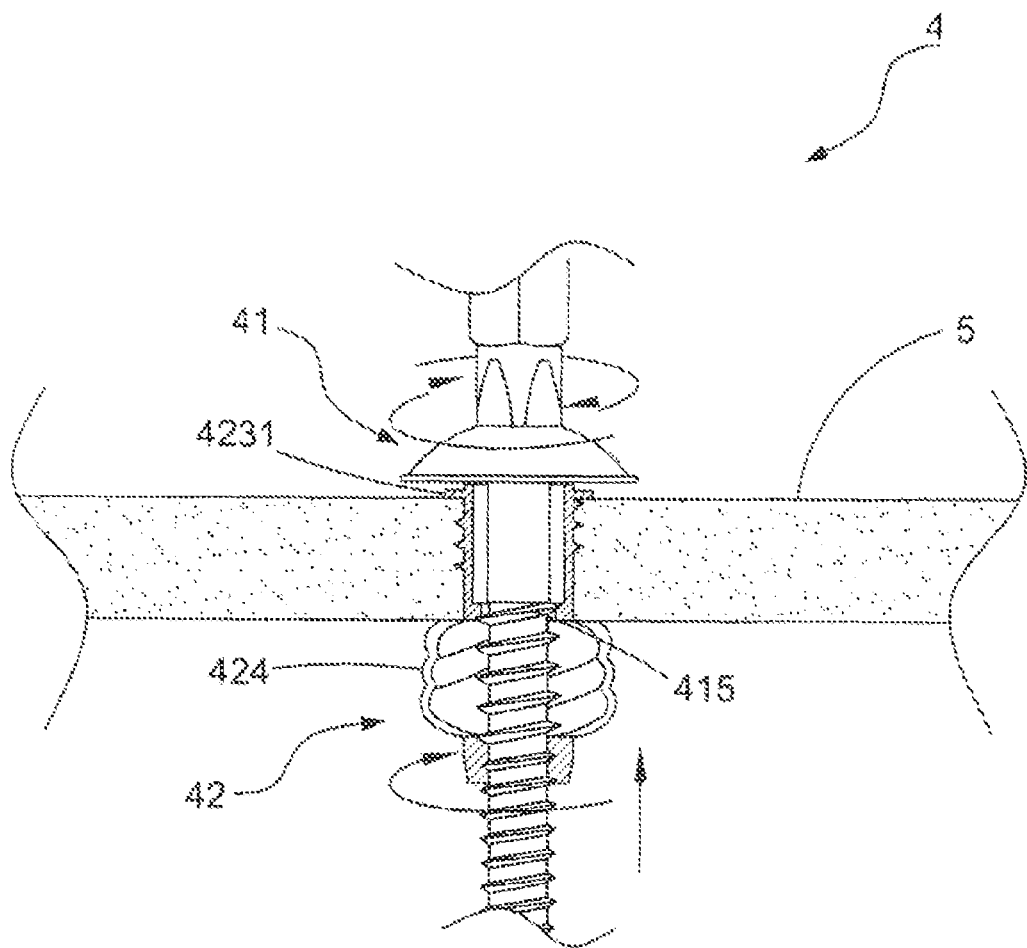

Referring to FIG. 5, in using, the drill element 43 is set against a gypsum object 5 for screwing. Herein, the threaded member 41 brings the outer sleeve 42 into the gypsum object 5 by screwing. When the peripheral flange 4231 touches the gypsum object 5, the threaded member 41 keeps rotating and the arms 424 start to deform and twist. When the deformation and the twisting of the arms 424 reach an extreme, the arms 424 stop deforming and twisting, which means the threaded member 41 completes its screwing and the threaded member 41 is firmly fixed. Moreover, since the second area diameter B2 on the outer sleeve 42 is larger than the first diameter A1 of the first threaded section 414 but smaller than the second diameter A2 of the second threaded section 415, and the third area disaster B3 is larger than the second diameter A2, the second threaded section 415 is able to block the second area 4222 and the third area 4223. Therefore, there is no interstice incurred between the second threaded section 415 and the second area 4222. Whereby, the warped and curled arms 424 stay out of the gypsum object 5, not in the interstice between the second threaded section 415 and the second area 4222 or into the gypsum object 5 as arrowed in FIG. 6. Consequently, the gypsum object 5 keeps the peripheral flange 4231 and the deformed arms 424 out. As a result, the self-drilling wall anchor device 4 of the present invention enhances its gripping effect and does not retract easily.

To sum up, the present invention in particularly utilizes the threaded member having the first threaded section and the second threaded section that provide different diameters and the through hole in the outer sleeve having the connected first area, second area, and third area that also provide different diameters to enhance the fastening effect. Namely, in view of afore different diameters, when the threaded member cooperates with the outer sleeve to execute screwing, the second threaded section blocks the second area as well as the third area. Accordingly, the arms deform and twist out of the gypsum object, not into the gypsum object, which largely enhances the gripping effect of the present invention. Moreover, the present invention does not retract easily once it is screwed and fastened in the object.

While we have shown and described the embodiment in accordance with the present invention, it should be clear to those skilled in the art that further embodiments may be made without departing from the scope of the present invention.

I claim:

1. A self-drilling wall anchor device comprising:
a threaded member having a shank, a head disposed at one end of said shank, an engaging part disposed at the other end of said shank, and a first threaded section as well as a second threaded section spirally disposed on said shank, between said head and said engaging part; wherein, a first diameter of said first threaded section is different from a second diameter of said second threaded section;
an outer sleeve made of a plastic material and allowing said threaded member to penetrate; said outer sleeve having a body, a through hole defined in said body for said threaded member to penetrate, a threaded portion disposed on said body, and arms disposed on said body, opposite to said threaded portion; wherein, said body has a first end and a second end defined thereon, said first end and said second end being communicated with said through hole in which a first area with a first area diameter is formed adjacent to said first end, a second area with a second area diameter is connected to said first area, and a third area with a third area diameter is connected to said second area and disposed near said second end; said first area diameter, said second area diameter and said third area diameter being different from each other; said second area diameter being further larger than said first diameter of said first threaded section but smaller than said second diameter of said second threaded section, and said third area diameter being larger than said second diameter of said second threaded section; said threaded portion being disposed near said second end, a peripheral flange being formed between said threaded portion and said second end, said peripheral flange having an outer diameter larger than a main diameter of said body, and a plurality of slots are defined on said arms; and a drill element having a drilling member and a bore disposed opposite to said drilling member for fixing said engaging part.

2. The self-drilling wall anchor device as claimed in claim 1, wherein, said first diameter of said first threaded section is smaller than said second diameter of said second threaded section, and said first diameter of said first threaded section is larger than a third diameter of said engaging part; said third area diameter of said third area is larger than said second area diameter of said second area, and said second area diameter is larger than said first area diameter.

* * * * *